United States Patent [19]
Addeo et al.

[11] Patent Number: 5,386,465
[45] Date of Patent: Jan. 31, 1995

[54] AUDIO PROCESSING SYSTEM FOR TELECONFERENCING WITH HIGH AND LOW TRANSMISSION DELAYS

[75] Inventors: Eric J. Addeo, Long Valley; Joseph J. Desmarais; Gennady Shtirmer, both of Morris Plains, all of N.J.

[73] Assignee: Bell Communications Research, Inc., Livingston, N.J.

[21] Appl. No.: 8,965

[22] Filed: Jan. 26, 1993

Related U.S. Application Data

[63] Continuation-in-part of Ser. No. 774,085, Oct. 19, 1991, Pat. No. 5,271,057.

[51] Int. Cl.⁶ ............................................. H04M 9/08
[52] U.S. Cl. .................................. 379/202; 379/406; 379/410; 379/392; 381/83
[58] Field of Search ............... 379/202, 390, 392, 406, 379/53, 54, 158, 395, 410, 388; 381/83

[56] References Cited

U.S. PATENT DOCUMENTS

| | | | |
|---|---|---|---|
| 3,183,304 | 5/1965 | Schroeder | 381/83 |
| 3,567,873 | 3/1971 | Peroni | 379/406 |
| 3,622,714 | 11/1971 | Berkeley et al. | 379/399 |
| 3,973,086 | 8/1976 | May, Jr. | 379/406 |
| 4,008,376 | 2/1977 | Flanagan et al. | 379/206 |
| 4,029,912 | 6/1977 | Geigel et al. | 379/406 |
| 4,253,000 | 2/1981 | Kasson | 379/202 |
| 4,644,108 | 2/1987 | Crouse et al. | 379/406 |
| 4,670,903 | 6/1987 | Araseki et al. | 379/411 |
| 4,748,663 | 5/1988 | Phillips et al. | 379/388 |
| 4,890,314 | 12/1989 | Judd et al. | 379/53 |
| 4,982,425 | 1/1991 | Yoshida | 379/390 |
| 4,991,166 | 2/1991 | Julstrom | 370/32.1 |
| 4,991,167 | 2/1991 | Petri et al. | 370/32.1 |
| 5,029,162 | 7/1991 | Epps | 370/77 |
| 5,271,057 | 12/1993 | Addeo et al. | 379/202 |

OTHER PUBLICATIONS

"Improving Audio Quality: Echo Control in Videoconferencing," G. Hill, Teleconference, Mar.–Apr. 1991, vol. 10, No. 2, pp. 29–43.

"High Quality Hands-free Telephony Using Voice Switching Optimised With Echo Cancellation," W. Armbruster, Signal Processing IV, 1988, J. L. Lacoume et al. (eds.), Elsevier Science Publishers, B.V., pp. 495–498.

"Some Aspects of Stereophony Applicable to Conference Use," F. K. Harvey et al., Journal Audio Engineering Society, Jul. 1963, vol. 11, pp. 212–217.

*Primary Examiner*—James L. Dwyer
*Assistant Examiner*—Ahmad F. Matar
*Attorney, Agent, or Firm*—Leonard Charles Suchyta; Loria B. Yeadon

[57] ABSTRACT

An audio processing system for use in teleconferencing systems having high and low transmission delays. The audio processing system utilizes complementary comb filters in combination with auxiliary echo suppressors, a frequency scaler, expander/gates and automatic level controlling devices to substantially improve acoustic stability margin and reduce far-end talker echo.

9 Claims, 8 Drawing Sheets

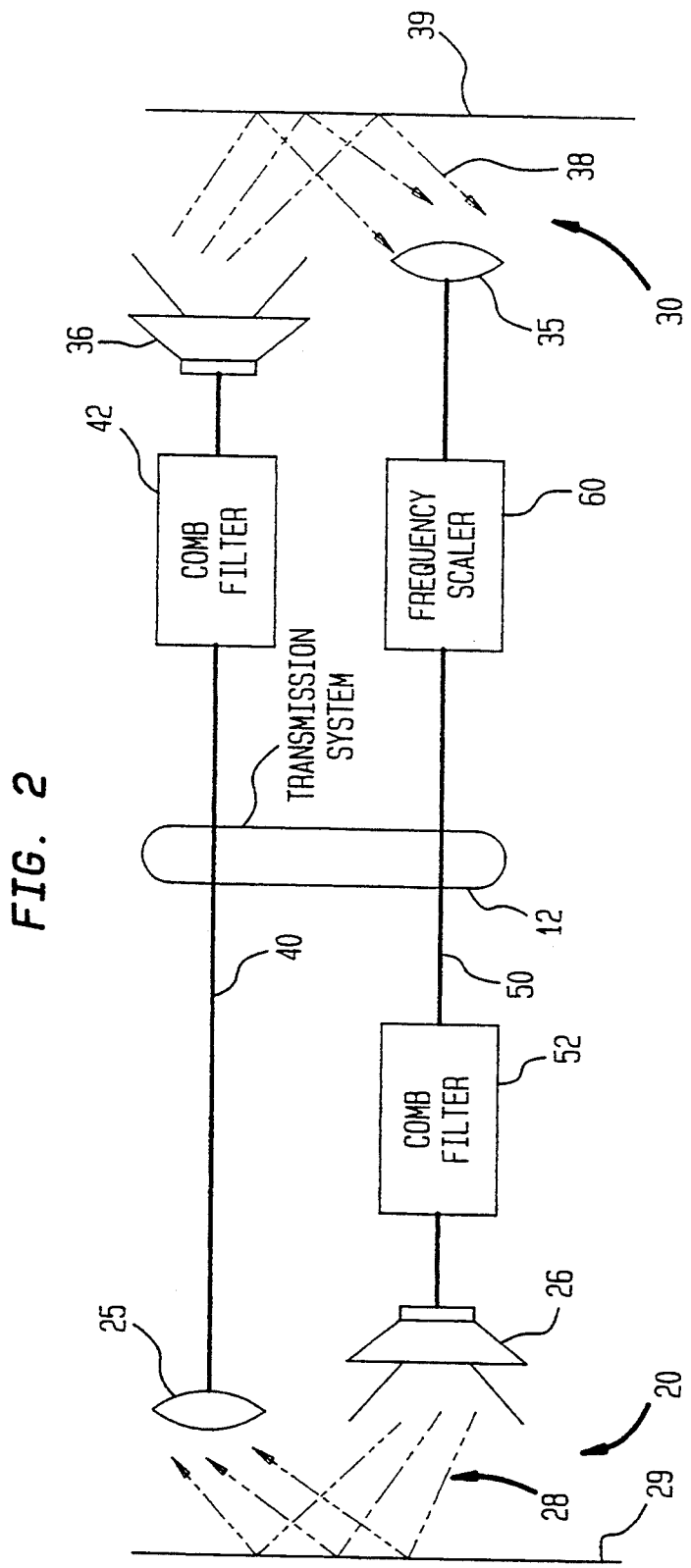

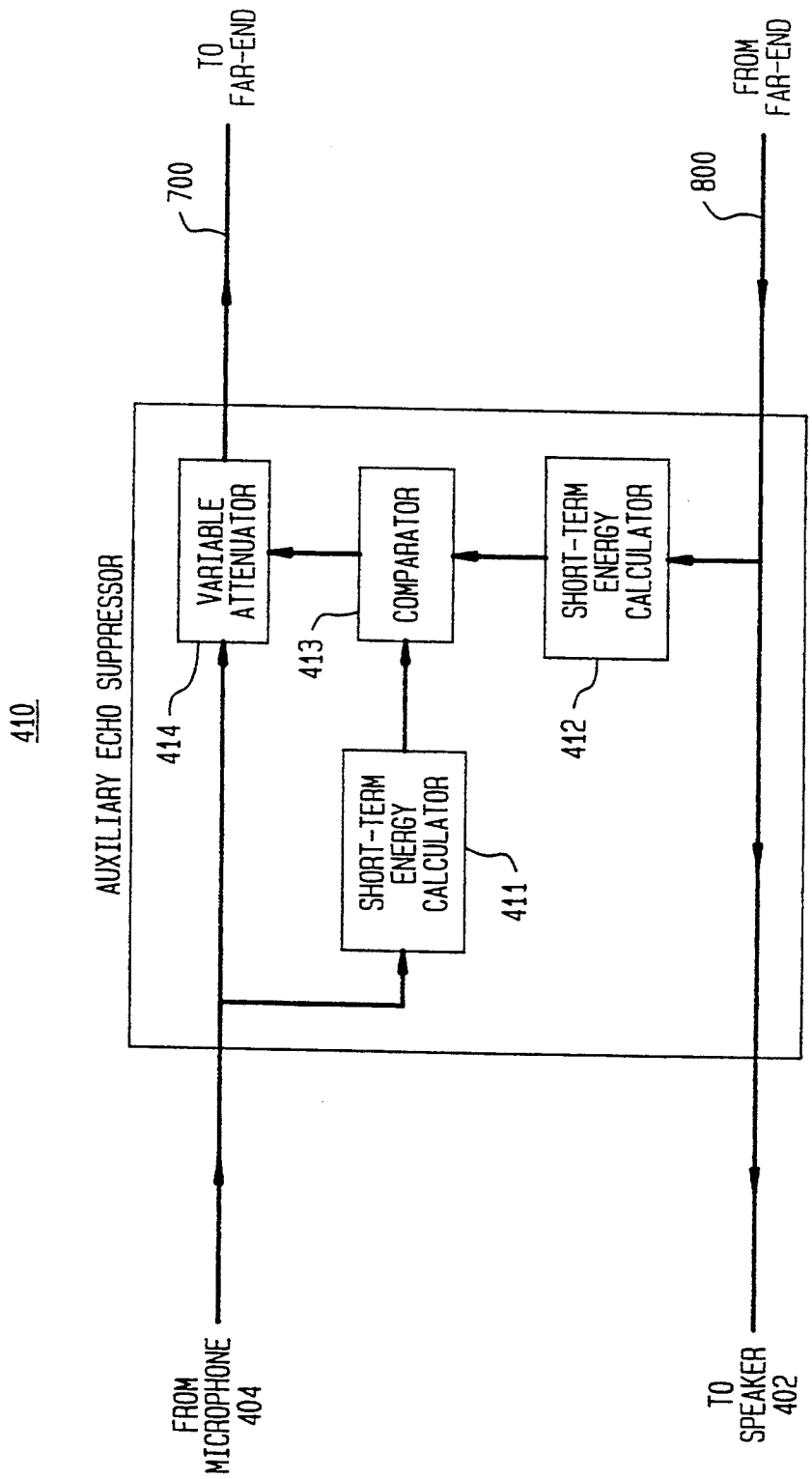

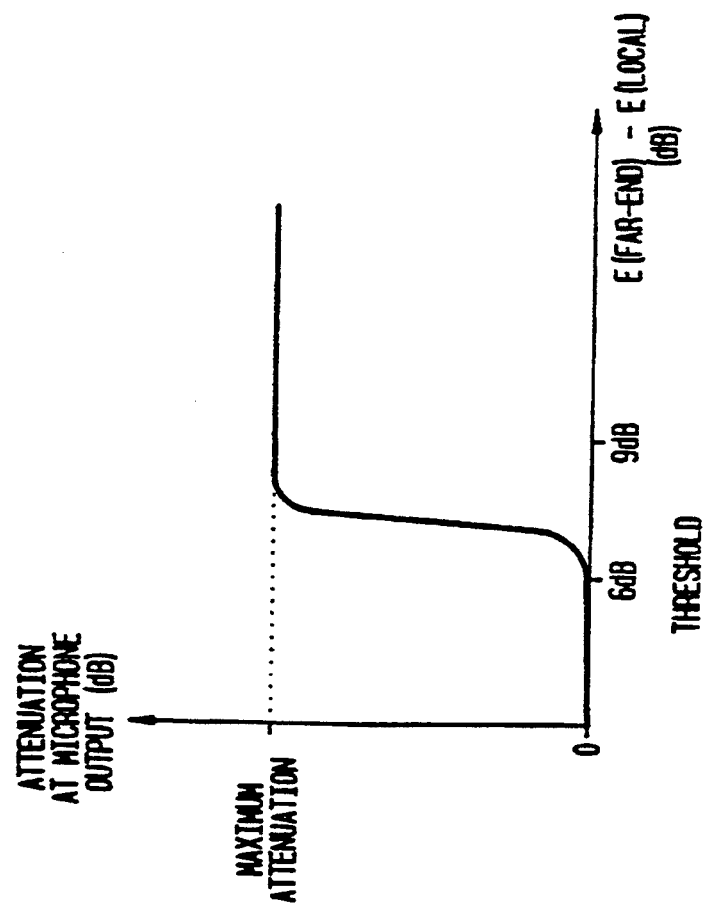

AUDIO PROCESSING SYSTEM FOR TELECONFERENCING WITH HIGH AND LOW TRANSMISSION DELAYS

RELATED APPLICATIONS

This application is a continuation in pan of co-pending application Ser. No. 774.085, entitled "Audio Processing System for Teleconferencing System," filed on Oct. 9, 1991, by E. Addeo, J. Desmarais, and G. Shtirmer which issued as U.S. Pat. No. 5,271,057 on Dec. 14, 1993.

FIELD OF THE INVENTION

The present invention relates to a teleconferencing system. Specifically, the present invention relates to an audio processing system for use in a teleconferencing system. The inventive audio processing system provides high quality speech transmission capability for fully interactive two-way audio communications. The inventive audio processing system is easy to implement, and in comparison to prior art systems, has an increased margin of acoustic stability and reduced far-end talker echo.

BACKGROUND OF THE INVENTION

The goal of a teleconferencing system is to bring the participants at the ends of the communication as "close together" as possible. Ideally, the effect obtained in good communication should be one of "being there" (See, e.g., U.S. Pat. No. 4,890,314, describing a teleconferencing system that includes a teleconferencing station which utilizes a high resolution display).

A teleconferencing system comprises two or more remotely located stations which are interconnected by a transmission system. Two teleconference participants located at the two remote stations are in audio and video communication with each other. To accomplish the audio and video communication, each station includes a microphone for generating an audio signal for transmission to the other station, a speaker for receiving an audio signal from the other station, a video camera for generating a video signal for transmission to the other station and a display apparatus for displaying a video signal generated at the other station. Each station also includes a codec for coding the video signal generated at the station for transmission in a compressed fashion to the other station and for decoding a coded video signal received from the other station.

The present invention relates to the audio processing portion of the teleconferencing system. The audio processing portion may be viewed as comprising a first microphone and a first speaker located at a first station and a second microphone and a second speaker located at a second station. A first channel is established in a transmission system for transmitting an audio signal from the first microphone at the first station to the second speaker at the second station. A second channel is established in the transmission system for transmitting an audio signal from the second microphone at the second station to the first speaker at the first station.

A problem with this type of audio system is acoustic coupling between the microphone and the speaker at each station. In particular, there is a round-trip feedback loop which, for example, is formed by: 1) the first microphone at the first station, 2) the channel connecting the first microphone to the second speaker at the second station. 3) the acoustic coupling path at the second station between the second speaker and the second microphone, 4) the channel connecting the second microphone and the first speaker at the first station, and 5) the acoustic coupling path at the first station between the first speaker and the first microphone. If at any time, the net loop gain is greater than unity, the loop becomes unstable and may oscillate. The result of this instability is the well-known "howling" sound. In such loops, even when the overall gain is low, there is still the problem of far-end talker echo, which stems from a speaker's voice returning to his ear, at a reduced but audible level after traveling around the loop. The acoustic echo problem worsens in teleconferencing systems as the transmission delay increases. Incompletely suppressed echoes which are not distinguishable to a teleconference participant at short transmission delays, become more distinguishable with longer transmission delays.

A variety of solutions have been proposed in the prior art for the problems of acoustic instability and acoustic echoes (see, e.g., G. Hill, "Improving Audio Quality Echo Control in Video Conferencing", Teleconference, Vol. 10, No. 2, March-April 1991; and W. Armbruster, "High Quality Hands-Free Telephony Using Voice Switching Optimized With Echo Cancellation", Signal Processing IV, J. L. Lacoume, et al, editors, Elsevier Science Publishers, B. V., 1988, pp. 495–498).

One approach to solving the echo problem in the audio processing loop of a teleconferencing system is to use an echo canceller. An echo canceller is a circuit which produces a synthetic replica of an actual echo contained in an incoming signal. The synthetic replica is subtracted from the incoming signal to cancel out the actual echo contained in the incoming signal. The echo canceller may be implemented by an adaptive transversal filter whose tap values are continuously updated using, for example, a least mean square algorithm to mimic the transfer function of the actual echo path. This type of echo canceller suffers from a number of disadvantages. First, the echo canceller is computationally complex, i.e., it requires the use of a significant number of specialized Digital Signal Processors for implementation. Second, for wideband speech (7 KHz), in rooms with a large reverberation time, the echo canceller requires a long transversal filter with about 4000 or more taps. Such long filters have a low convergence rate and poorly track the transfer function of the actual echo path. In addition, some echo cancellers implemented using an adaptive transversal filter must be trained with a white noise training sequence at the beginning of each teleconference. Retraining may be required during the teleconference.

Another technique for solving the echo problem is to place an echo suppressor at the output of the microphone at each teleconferencing station. Typically, the echo suppressor comprises a level activated switch which controls a gate and a variable attenuation device. When the signal level at the output of a microphone is below a threshold level, a gate is closed to block the communication channel leading away from the microphone. When the signal level at the output of the microphone is above a threshold level, the gate is open to place the communication channel leading away from the microphone into a pass state. Illustratively, the threshold level of the echo suppressor may be set to the maximum level of the return echo. For this system, when one teleconference participant is talking, his local echo suppressor opens the local gate so that the channel to the remote station is open. If the other teleconference participant at the remote station is not talking, the echo suppressor at the remote station closes the gate at the remote station so that the echo return path is blocked. Some echo suppressors open or close the gate to the communication channel by detecting the presence or absence of local speech rather than by simply determining if a microphone output signal is above or below a threshold.

When the participants at both ends of the teleconference try to speak at the same time, a condition known as double talk exists. Under the double talk condition, the echo suppressor gates at both ends of the teleconference are open, and there is the possibility of acoustic echo being returned to both participants as well as the possibility of acoustic instability. In this case, each echo suppressor utilizes its variable attenuation device to introduce the amount of attenuation necessary to suppress the acoustic echo and ensure acoustic stability. Thus, the echo is reduced, but so is the audio signal generated by the speech of the teleconference participants. In many cases, the amount of attenuation which has to be introduced at the output of each microphone for echo suppressor may be too great to maintain fully interactive two-way communication between participants. Thus, this type of echo suppressor is not entirely satisfactory for use in a teleconferencing system.

In addition to the use of echo suppressors and echo cancellers, frequency shifters or special filters may be utilized in the audio processing system of a teleconferencing system. For example, a frequency shifter may be utilized to increase the margin of acoustic stability (see, e.g., U.S. Pat. No. 3,183,304, and F. K. Harvey et al, "Some Aspects of Stereophony Applicable to Conference Use", Journal Audio Engineering Society, Vol. 11, pp. 212-217, July 1963).

Alternatively, comb filters with complementary pass and stop bands may be placed in the two audio channels connecting the two stations of a teleconference (see, e.g., U.S. Pat. No. 3,622,714 and U.S. Pat. No. 4,991,167). The use of the complementary comb filters mitigates the effect of acoustic coupling between the speaker and microphone at each station. The reason is that any signal going around the feedback loop is processed by both comb filters and will be attenuated across its entire spectrum as the stop bands of the two comb filters are complementary. This improves the margin of acoustic stability to some extent and reduces far-end talker echo. On the other hand a speech signal which travels from one station to the other is only processed by one comb filter and is not attenuated appreciably across its entire spectrum. In comparison to echo cancellers, comb filters have the advantage of simplicity. However, comb filters introduce some degradation in perceived speech quality and do not always provide a sufficient margin of acoustic stability. The reason for the degradation is that the frequency response of a room in which the microphone and speaker of a station are located is characterized by a large number of resonant peaks. The band transitions in the comb filter transfer functions are often not sharp enough to suppress the resonant peaks, because if the transitions are too sharp the quality of the transmitted audio signal is adversely affected.

In view of the foregoing, it is an object of the present invention to provide an audio processing system for use in a teleconferencing system. Specifically, it is an object of the present invention to provide an audio processing system which permits two-way fully interactive audio communications in a teleconferencing system, while at the same time suppressing far-end talker echoes and providing a satisfactory margin of acoustic stability. Finally, it is an object of the present invention to provide an audio processing system for use in a teleconferencing system which utilizes complementary comb filters, but provides a satisfactory margin of acoustic stability and mitigates the degradation in perceived speech quality caused by the comb filters.

SUMMARY OF THE INVENTION

In accordance with an illustrative embodiment of the present invention, to process audio signals, a teleconferencing system comprises a first microphone and a first speaker located at a first station and a second microphone and a second speaker located at a second station. A first comb filter whose transfer function includes a set of alternating pass and stop bands is located in the transmission channel between the first microphone at the first station and the second speaker at the second station. A second comb filter which is complementary to the first comb filter is located in the transmission channel between the second microphone at the second station and the first speaker at the first station. A frequency scaler is located in one of the channels for scaling by a constant factor the frequency spectrum of a signal in the one channel. A frequency scaler is a device which receives an input signal with a frequency domain representation $X(F)$, where f is the frequency domain variable, and outputs a signal having a frequency domain representation $X'(f) = X(\beta f)$ where $\beta$ is a constant.

Illustratively, the center frequencies of the passbands of the comb filters are spaced apart by an odd simple fraction such as one-third, one-fifth, one-seventh, etc. of an octave. The reason for a spacing of an odd simple fraction of an octave is to remove harmonic interdependence between bands to prevent the entire spectrum for one speaker from falling into the stop bands of a comb filter. The transitions between bands are smooth (sinusoidal), since sharper band transitions begin to introduce more substantial impairments in the quality of transmitted speech. As will be explained later, smooth transitions reduce the amount of echo suppression and the margin of acoustic stability.

As a consequence, comb filters alone may not provide adequate margin of acoustic stability because of the specific nature of the frequency response of a room in which the microphone and speaker of a station are located. This frequency response is characterized by a large number of resonant peaks which may not be adequately nulled by the complementary comb filters. The frequency scaler breaks up these resonances by introducing changes in the frequency spectrum during each trip an audio signal takes around the feedback loop. The frequency scaler can, in some embodiments, provide 6 dB of additional stability margin.

The above described audio processing system is suitable for use in low delay (less than 50 msec) transmission systems. At such low delays, echo is not as serious a problem as in longer delay systems therefore allowing the use of comb filters with sinusoidal band transitions. These filters provide approximately 12 dB of echo suppression and the same amount of stability margin. Because such comb filters do not substantially degrade speech quality to an extremely large degree, they can be inserted permanently into the return audio path leading to each speaker. In larger delay systems, where far-end echoes are a more serious problem, two alternative illustrative embodiments are described. In one embodiment, comb filtering with sharper band transitions may be warranted to achieve greater echo suppression and an even greater margin of acoustic stability. However, such filters impair the quality of transmitted speech.

To mitigate the degradation in perceived speech quality caused by the comb filters, dynamic comb filters may be utilized in combination with echo suppressors. In this embodiment of the invention, at each station in a teleconferencing system, there is an echo suppressor connected to the output of the microphone and a dynamic filter connected to the input of the speaker. The dynamic filter may be switched between a pass state and a comb filter state. Specifically, the filter is switched to the pass state only when no local speech is present so that the output channel of the microphone is blocked by the echo suppressor. When local speech is present, causing the output of the microphone to be opened by the echo suppressor, the comb filter is activated and inserted into the return echo path leading to the speaker.

When only one participant is speaking, the insertion of the comb filter at the input of the local speaker has little effect because the return echo path is also blocked by the echo suppressor of the participant at the far end who is not speaking. However, during a double talk condition, the comb filters at both teleconferencing stations are activated. This is when the gates associated with the echo suppressors at both ends of the teleconference are open and there is the potential for both acoustic echoes and acoustic instability. In this case wherein both comb filters are activated, a signal must go through both comb filters to travel around the feedback loop so as to be returned as an echo. Because the comb filters are complementary, attenuation of undesired signals is achieved.

This embodiment of the invention is advantageous because the comb filters are only active during double talk. Thus, any degradation in speech quality caused by the comb filters occurs only when there is a double talk condition. To achieve an even greater margin of stability, a frequency scaler may be included in one of the channels of the feedback loop.

Another alternative illustrative embodiment for handling echoes and acoustic instabilities in large delay systems includes auxiliary echo suppressors in combination with complementary comb filters with sinusoidal band transition. In this embodiment, far-end talker echo is reduced and the margin of acoustic stability is increased sufficiently to be suitable for both low and high delay transmission systems. An auxiliary echo suppressor is located at each station having a speaker and a microphone. The auxiliary echo suppressor inserts an attenuation at the output of a microphone based upon a comparison of the energy level of the signal output from the microphone and the energy level of the signal directed towards the speaker at the station.

In this embodiment, a comb filter is located between the microphone and auxiliary echo suppression at each station, and the pair of comb filters between two teleconferencing stations are complementary. Placing the comb filter between the auxiliary echo suppressor and the microphone helps the auxiliary echo suppressors distinguish between acoustically coupled versus locally generated speech, since the acoustically coupled speech will have been processed by both complementary comb filters while the latter will have been processed by only one of the two comb filters. This embodiment also includes frequency scaling, expander/gates, and automatic level controllers for reducing noise and smoothing out the operation of the individual components.

In short, in accordance with the present invention, an audio processing system of a teleconferencing system utilizes comb filters in combination with echo suppressors and a frequency scaler to reduce far-end talker echo and increase the margin of acoustic stability.

BRIEF DESCRIPTION OF THE DRAWING

FIG. 2 schematically illustrates an audio processing system for use in the teleconferencing system of FIG. 1, in accordance with the present invention.

FIG. 6A shows an illustrative embodiment of an auxiliary echo suppressor.

FIG. 7 depicts a plot of the attenuation inserted at the microphone output by an auxiliary echo suppressor of FIG. 6 as a function of the difference between the energy of the signal received at a speaker and the energy of a signal from a microphone at a station.

DETAILED DESCRIPTION OF THE INVENTION

Figure 1:
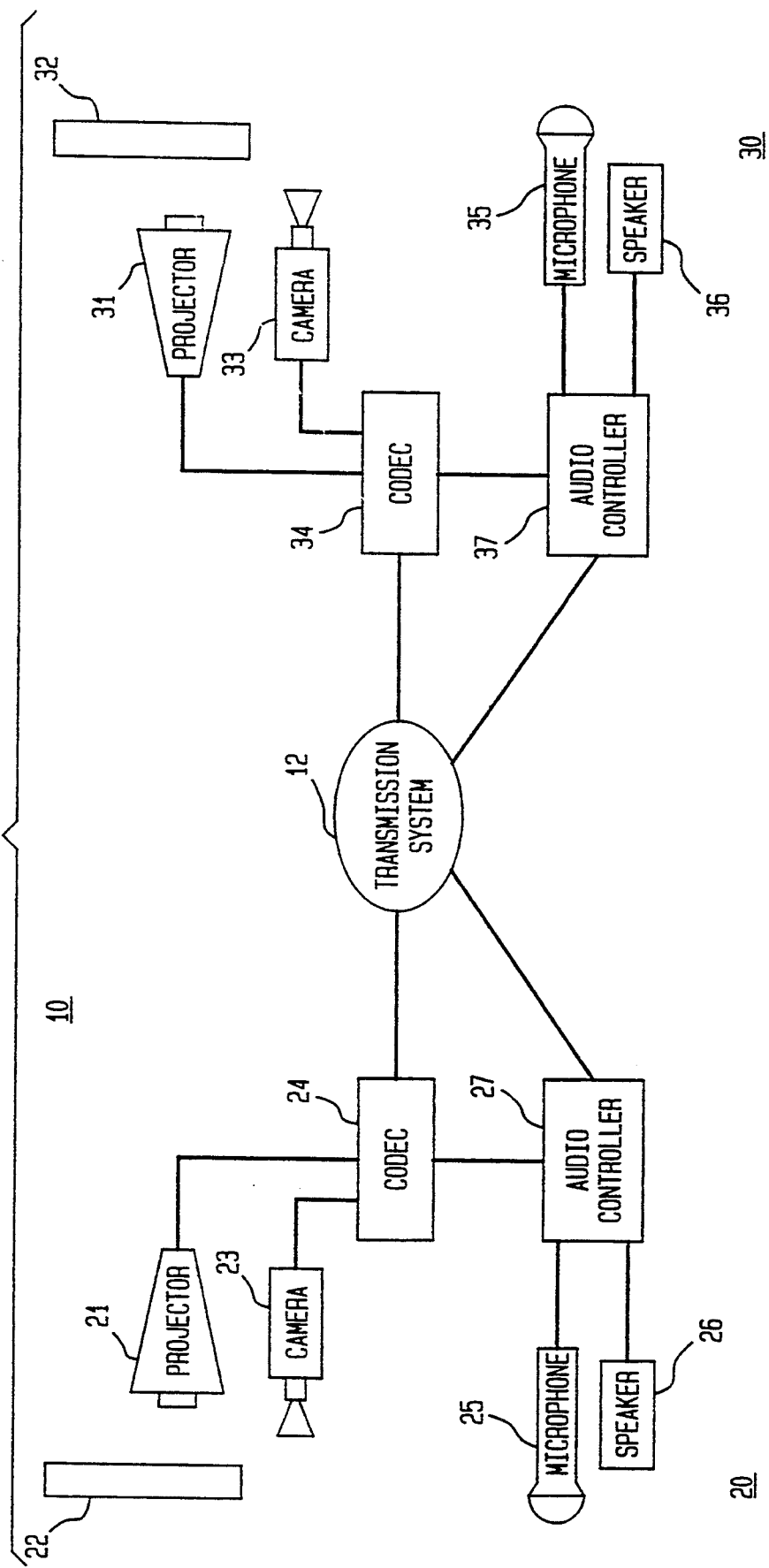
FIG. 1 schematically illustrates a teleconferencing system.

FIG. 1 illustrates a conferencing system with audio and video communication capabilities. The conferencing system 10 of FIG. 1 comprises at least two stations 20 and 30 which are remotely located from one another and interconnected by the transmission system 12.

For video communications, the station 20 includes the projector 21 for displaying a video image on the screen 22, the video camera 23 and the codec 24. Similarly, the station 30 includes a projector 31 for displaying a video image on a screen 32, a video camera 33 and a codec 34. The camera 23 generates a video signal at the station 20. The video signal is coded for compression by the codec 24 and transmitted via the transmission system 12 to the station 30. For example, the transmission system 12 may offer transmission facilities operating at first or third level digital signals (DS1 and DS3, respectively) DS1 or DS3 transmission rates which are North American telephone network digital transmission rates at 1.5 and 45 megabits per second, respectively. At the station 30, the video signal is decoded by the codec 34 and converted into an image by the video projector 31 for display on the screen 32. In a similar manner, the camera 33 at the station 30 generates a video signal for display at the station 20 by the projector 21 on the screen 22.

For audio communications, the station 20 includes the microphone 25, the amplified speaker 26 and the audio controller 27. Similarly, the station 30 includes the microphone 35, the amplified speaker 36, and the audio controller 37. To transmit speech from the station 20 to the station 30, the microphone 25 converts the speech into an audio signal. The audio controller 27 matches the processing delay of the audio signal to the processing delay introduced into video signal from the camera 23 by the codec 24. The audio controller 27 may also include one or more circuits for preventing acoustic instability and for eliminating echoes. The audio signal is transmitted through the transmission system 12 to the station 30. At the station 30, the audio signal is processed by the audio controller 37 to match delays introduced by the decoding operation of the codec 34 for the corresponding video signal. The audio signal is then converted back to acoustic form by the speaker 36. A similar process is utilized to transmit speech from the microphone 35 of the station 30 to the speaker 26 of the station 20.

FIG. 2 schematically illustrates the acoustic feedback path which is incorporated in the teleconferencing system 10 of FIG. 1. As indicated above in connection with FIG. 1, the station 20 includes the microphone 25 and the speaker 26. The microphone 25 and speaker 26 are arranged for hands-free use by a teleconference participant at the station 20. Because the station 20 is located in a room, there is acoustic coupling between the speaker 26 and the microphone 25. Such acoustic coupling is represented in FIG. 2 by the acoustic paths 28 which illustratively include reflections or reverberations off a wall 29. Similarly, at the station 30 there is acoustic coupling between the speaker 36 and microphone 35 via the paths 38 which reflect off a wall 39.

As shown in FIG. 2, the microphone 25 at the station 20 is connected to the speaker 36 at the station 30 by the channel 40 which goes through the transmission system 12. Similarly, the microphone 35 at the station 30 is connected to the speaker 26 at the station 20 by the channel 50, which also goes through the transmission system 12. The channel 40 includes the comb filter 42. For illustrative purposes, the comb filter 42 is located at station 30 between speaker 36 and transmission system 12. The comb filter 42 may be associated with station 20 and located between microphone 25 and transmission system 12 in the channel 40, provided its complementary comb filter is located in channel 50.

The channel 50 includes the comb filter 52. Illustratively, the comb filter 52 is shown in FIG. 2 to be located in channel 50 associated with the station 20 at the input of the speaker 26. However, comb filter 52 could be associated with station 30 and located between the transmission system 12 and the microphone 35. A frequency scaler 60 is illustratively shown in FIG. 2 to be located in channel 50 and associated with station 30. However, the frequency scaler 60 could be located in channel 50 and associated with station 20 or in channel 40 and associated with station 20 or 30. Prior to entering a teleconferencing session, stations 20 and 30 will negotiate, possibly via signalling, to ensure that channels 40 and 50 established between stations will each contain a complementary comb filter, and that proper frequency scaling is provided between the two channels. As a result, some teleconferencing stations may have to make equipment changes (automatically or manually) to configure the channels as described above.

If the comb filter 42, the comb filter 52, and frequency scaler 60 were not present, there would be an acoustic feedback loop present in the audio processing system of FIG. 2. The acoustic feedback loop may be understood as follows. Consider speech which originates at the station 20. This speech is converted from acoustic form to an electronic audio signal by the microphone 25. The audio signal is then transmitted via the channel 40 to the speaker 36 at the station 30, where the audio signal is converted back onto acoustic form. The speech in acoustic form is then coupled via the acoustic paths 38 to microphone 35 where it is converted back into an electronic audio signal and transmitted via the channel 50 to the speaker 26 at the station 20. The speaker 26 converts the electronic audio signal back into acoustic form and the speech is transmitted via the acoustic paths 28 back to the microphone 25.

If the roundtrip gain of the loop is greater than unity, acoustic instability results. Even if the roundtrip gain is less than unity, the speaker at the station 20 may hear an echo at the station 20. The greater the audio processing delays, the more distinguishable is the echo for the speaker at the station 20. To provide a margin of acoustic stability and to suppress the far-end echo, the channel 40 includes the comb filter 42, and the channel 50 includes the comb filter 52 and frequency scaler 60.

Figure 3A:
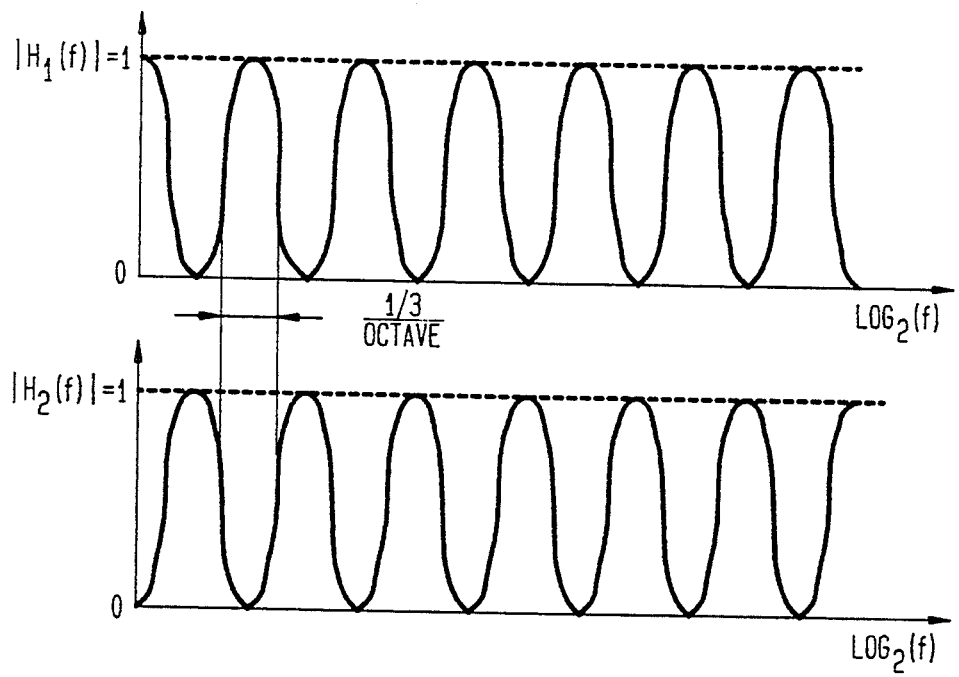
FIG. 3A illustrates the transfer functions of a pair of complementary comb filters for use in the audio processing system of FIG. 2.

The transfer function $H_1(f)$ of the comb filter 42 and the transfer function $H_2(f)$ of the comb filter 52 are illustrated in FIG. 3A. The transfer functions $H_1(f)$ and $H_2(f)$ comprise alternating passbands and stopbands. The transfer functions $H_1(f)$ and $H_2(f)$ are complementary in that, the passbands of one transfer function overlap in frequency the stopbands of the other transfer function and vice versa. The maximum depth of the nulls in the transfer functions is infinite, but the transitions are sinusoidal. Band transitions that are too sharp introduce noticeable impairment in the quality of transmitted speech. The transfer function extends over a frequency range on the order of 8 KHz and the peak-to-trough spacing in the transfer functions is one-third of an octave.

The reasoning behind this choice is that a one-octave spacing is too coarse and, therefore, does not provide a sufficient frequency sampling of the speech signal, with the potential ability to wipe out whole formants from the speech spectrum. Research has shown that the elimination of key formants from the speech signal, especially any of the first three, severely impairs the intelligibility and recognition quality of speech. On the other hand, finer sampling, with 1/5 of an octave or greater spacing, results in filters that produce a ringing effect (characterized by strong reverberation and chattering sound), therefore, also degrading the speech quality.

It was also found that filter shapes in the passbands and stopbands, and in the band transition regions are just as critical to the perceived quality. Keeping the band spacing fixed, say at ⅓ of an octave, it was determined that smoother transitions between bands reduced the ringing of the filters while introducing smaller signal delays in the actual realization.

In fact, the shortest filter delays and the most acceptable sound quality, with the ⅓ octave band spacing were achieved by shaping the filters' magnitude responses as perfectly raised sinusoids with logarithmic periodicity.

One of the benefits of using the comb filters is the improved acoustic stability. Specifically, the attenuation introduced in the speech signal after passing through the two complementary sinusoidally shaped filters varies between infinity and 12 dB. The highest points, −12 dB, occur where the two complementary spectra intersect. Therefore, the worst case acoustic stability improvement due to our filters is 12 dB. Another benefit of the comb filters is reduced acoustic echo. This can be quantified at approximately 12 dB as perceived by the teleconference participant.

The comb filters 42 and 52 mitigate the effects of acoustic coupling between the speaker and the microphone at each station. As indicated above, the reason is that any signal going around the feedback loop is processed by both comb filters and will be attenuated across its entire spectrum as the stopbands of the two comb filters are complementary. For the same reason, echoes transmitted back to the near-end station resulting from acoustic coupling between the speaker and microphone at the far-end station are also reduced. On the other hand, a signal which travels from the microphone at one station to the speaker at the other station is processed by only one comb filter so that it is not attenuated across its entire spectrum.

Figure 4:
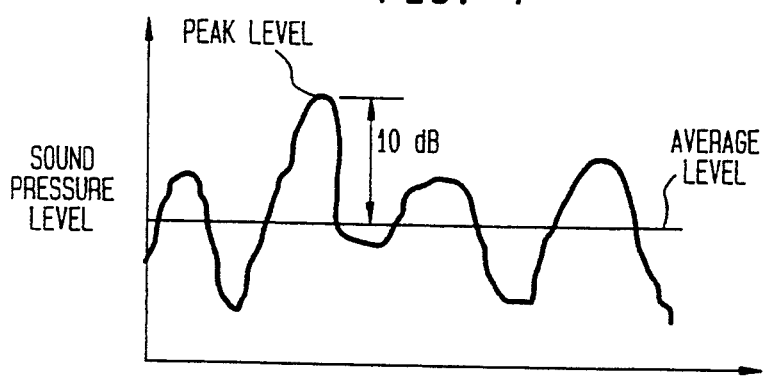
FIG. 4 illustrates the acoustic response function of a room in which a station of the teleconferencing system of FIG. 1 is located.

Because band transitions in the transfer functions of the comb filters 42 and 52 are not steep, the comb filters by themselves do not provide an adequate margin of acoustic stability. The inadequacy of the comb filter is due to the frequency response of the room in which the station 20 or station 30 is located. The acoustic frequency response of such a room is illustrated in FIG. 4. In particular, FIG. 4 plots sound pressure level versus frequency for a typical room containing a teleconferencing station.

As can be seen in FIG. 4, the acoustic environment includes many resonances represented by sharp peaks in the frequency response. These resonances are not suppressed enough by the comb filters to provide an adequate stability margin.

Figure 3B:
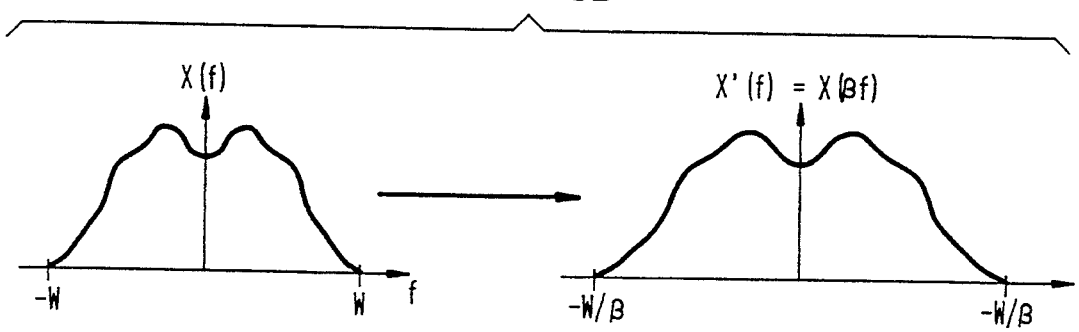
FIG. 3B illustrates the frequency scaling operation.

The frequency scaler 60 scales the frequency spectrum of a signal by transforming an input signal with a spectrum $X(f)$ into an output signal with a spectrum $X'(f)=X(\beta f)$. This frequency scaling operation is illustrated in FIG. 3B. Illustratively, the constant factor is greater than one and is in a range of approximately 1.01 to 1.03. At DS-3 rates, the use of a frequency scaler in one of the channel paths 40 or 50 of FIG. 2, permits an additional 6–9 dB (combined total for both stations) of audio amplitude without acoustic instability. The combined processing of the comb filters 42 and 52 and the frequency scaler 60 results in a total stability margin of about 18 dB and an Echo Return Loss Enhancement of 12 dB.

The frequency scaler 60 serves to break up the acoustic resonances of the teleconferencing station by scaling the frequency spectrum by a factor $\beta$ for a roundtrip so as to move particular frequency components in the audio signal away from a station's resonant peaks. Thus, a frequency component of a signal, which is at a resonant frequency of a room containing station 30 and which enters the microphone 35 of FIG. 2, has its frequency scaled by the frequency scaler 60 so that when it traverses the path around the loop and returns to station 30 via speaker 36 it is no longer at a resonant frequency.

The audio processing system of FIG. 2 is suitable for use in low delay (less than 50 msec) transmission systems. At such low delays, echo is not as serious a problem as in longer delay systems therefore allowing the use of comb filters with smooth band transitions. Because such comb filters do not significantly degrade speech quality, the audio processing system of FIG. 2 has comb filters with smooth band transitions inserted permanently into the return audio path leading to each speaker. In larger delay systems where far-end echoes are a more serious problem, two illustrative embodiments are described. In one illustrative embodiment, comb filtering with sharp band transitions may be utilized to achieve greater echo suppression and an increased margin of acoustic stability. However, such filters with steep band transitions impair the quality of transmitted speech and have a complicated design. Hence, the comb filters of a long delay audio processing system are preferably not permanently inserted into the return audio path leading to each speaker.

Figure 5:
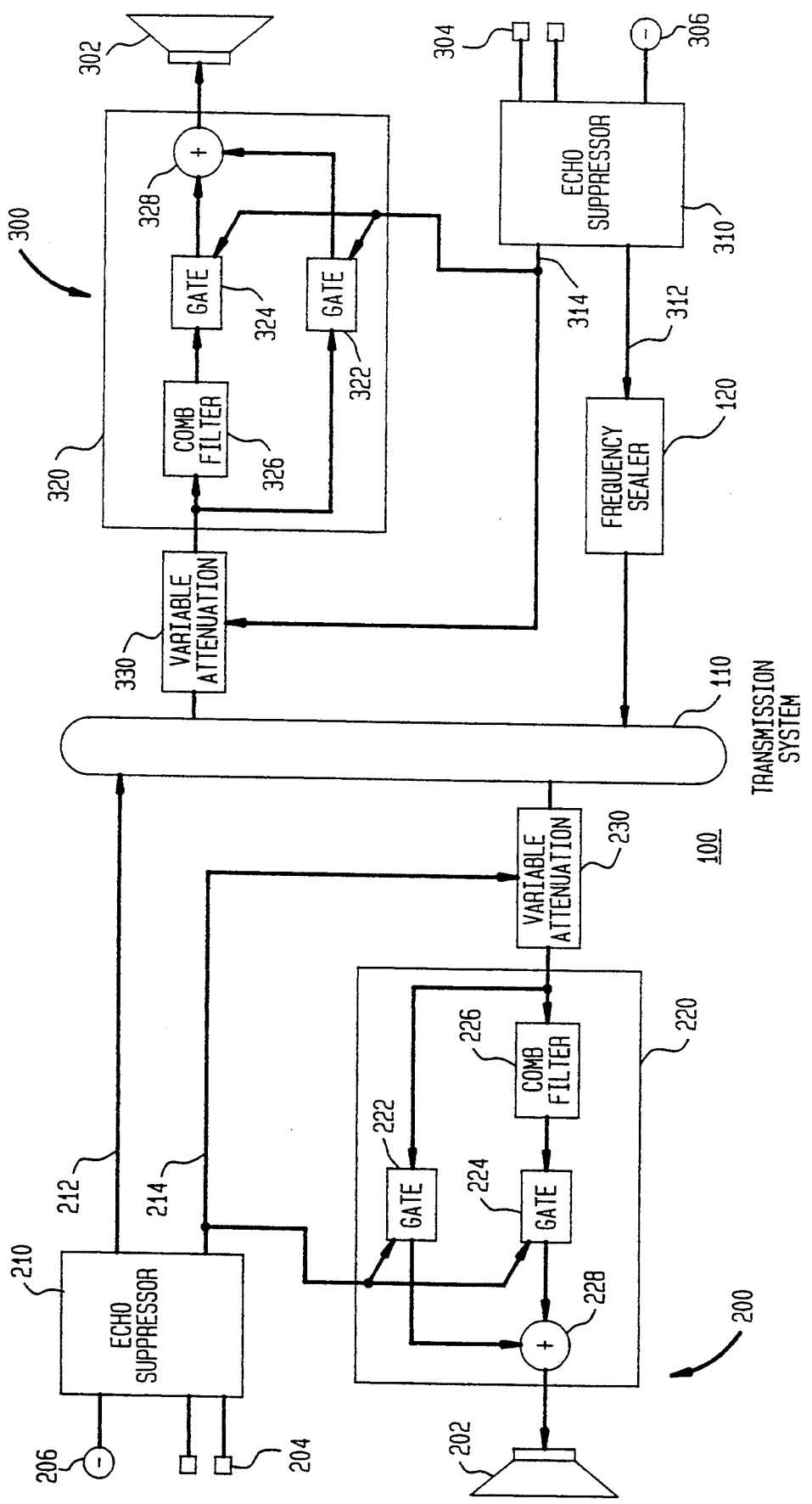
FIG. 5 illustrates an alternative audio processing system for use in the teleconferencing system of FIG. 1, in accordance with the present invention

An alternative embodiment of an audio processing system for a teleconferencing system having large transmission delays is illustrated in FIG. 5. The system 100 of FIG. 5 comprises the station 200 and the station 300. The station 200 and the station 300 are interconnected by a transmission system 110. The station 200 comprises the amplified speaker 202 and one or more microphones 204. Similarly, the station 300 comprises the amplified speaker 302 and one or more microphones 304. The purpose of the system 100 is to transmit speech signals from the microphones 204 of the station 200 to the speaker 302 of the station 300 and to transmit speech signals from the microphones 304 of the station 300 to the speaker 202 of the station 200 without echoes and acoustic instability.

To eliminate acoustic instabilities and suppress echoes, the station 200 includes the echo suppressor 210, the dynamic filter 220, and the variable attenuator 230. Similarly, the station 300 includes the echo suppressor 310, the dynamic filter 320 and the variable attenuator 330.

The echo suppressors 210 and 310 are implemented by gating systems. Each echo suppressor 210, 310 operates in response to the presence of local speech. When the local speech is present, the echo suppressor is in the pass state. When no local speech is present, the echo suppressor is in the blocking state. One problem with this type of gating, especially in noisy rooms, is "noise pumping". Noise pumping occurs when room background noise is alternately transmitted to the far end and blocked as a result of the local echo suppressor switching from the pass state to the blocking state. This is an undesirable effect for a listener at the far end.

To circumvent this problem, a periodically updated replica of room noise 206, 306 is fed to one input of each echo suppressor 210, 310. The other inputs 204, 304 are microphones which pick up local speech. When any of the inputs 204 or 304 become active due to local speech, the echo suppressor 210 or 310 automatically attenuates each of its microphone inputs to keep its total output from all inputs constant. This arrangement eliminates noise pumping caused by the gating action of the echo suppressor.

The echo suppressors 210 and 310 each have two outputs, 212 and 214, and 312 and 314, respectively. When an echo suppressor 210 or 310 is in the pass state, the output 212 or 312 is the combination of all the inputs and the output 214 or 314 is the combination of the microphone inputs 204 or 304. Echo suppressors which operate in this manner can be implemented by automatic gating mixer systems which are commercially available.

The output 212 of the echo suppressor 210 and the output 312 of the echo suppressor 310 are connected via the transmission system 100 to the other station. The outputs 214 and 314 are connected to the dynamic filters 220 and 320, respectively, to control these filters. The dynamic filter 220 comprises a first gate 222, a second gate 224, a comb filter 226 and a multiplexer 228. Similarly, the dynamic filter 320 comprises a first gate 322, a second gate 324, a comb filter 326 and a multiplexer 328.

The dynamic filter 220 operates as follows. When the signal level at the output 214 exceeds a threshold level, the gate 222 is opened, the gate 224 is closed and the comb filter 226 is bypassed. When signal level at the output 214 is below the threshold, the gate 224 is open and the gate 222 is closed so that the comb filter is connected to an input of the speaker 202 via the multiplexer 228. Similarly, for the filter 320, the comb filter 326 is bypassed or connected via the multiplexer 229 to the speaker 302 depending on the signal level at the echo suppressor output 314 that is applied to the gates 322 and 324. The comb filters 226 and 326 are complementary.

It should be noted that if there is speech at only one end of the teleconference, a comb filter is inserted into a channel that is already blocked by an echo suppressor at the far end. Thus, in this case the role of the comb filter is not particularly important.

The use of the comb filters 226 and 326 is most important when a double talk condition exists. In the double talk condition, neither echo suppressor 210 and 310 is in the blocking state and the possibility for echo and acoustic instability exists. In this case, both comb filters 226 and 326 are activated at the same time. Because the comb filters 226 and 326 are complementary and a signal is processed by both comb filters during a trip around the feedback loop, attenuation of the undesired return signal occurs across its entire spectrum. Because each participant hears the non-echo desired speech signal from the far end through a comb filter only during the existence of a double talk condition, most of the degradation in speech quality that results from the use of comb filters is eliminated.

To remove any residual acoustic echo, a variable attenuator 230 is connected in series with the filter 220 and a variable attenuator 330 is connected in series with the filter 320. The variable attenuators 230 and 330 are activated when a threshold signal level is surpassed at the echo suppressor outputs 214 and 314, respectively. As for the comb filters 226 and 326, the variable attenuators 230 and 330 are only effective during a double talk condition.

In addition, a frequency scaler 120 may be included in one of the channels of the system 100 to scale the frequency spectrum of a signal propagating in that channel to override any strongly peaked acoustical resonances. For example, the frequency scaler 120 may be connected to the output 312 of the echo suppressor 310.

Figure 6:
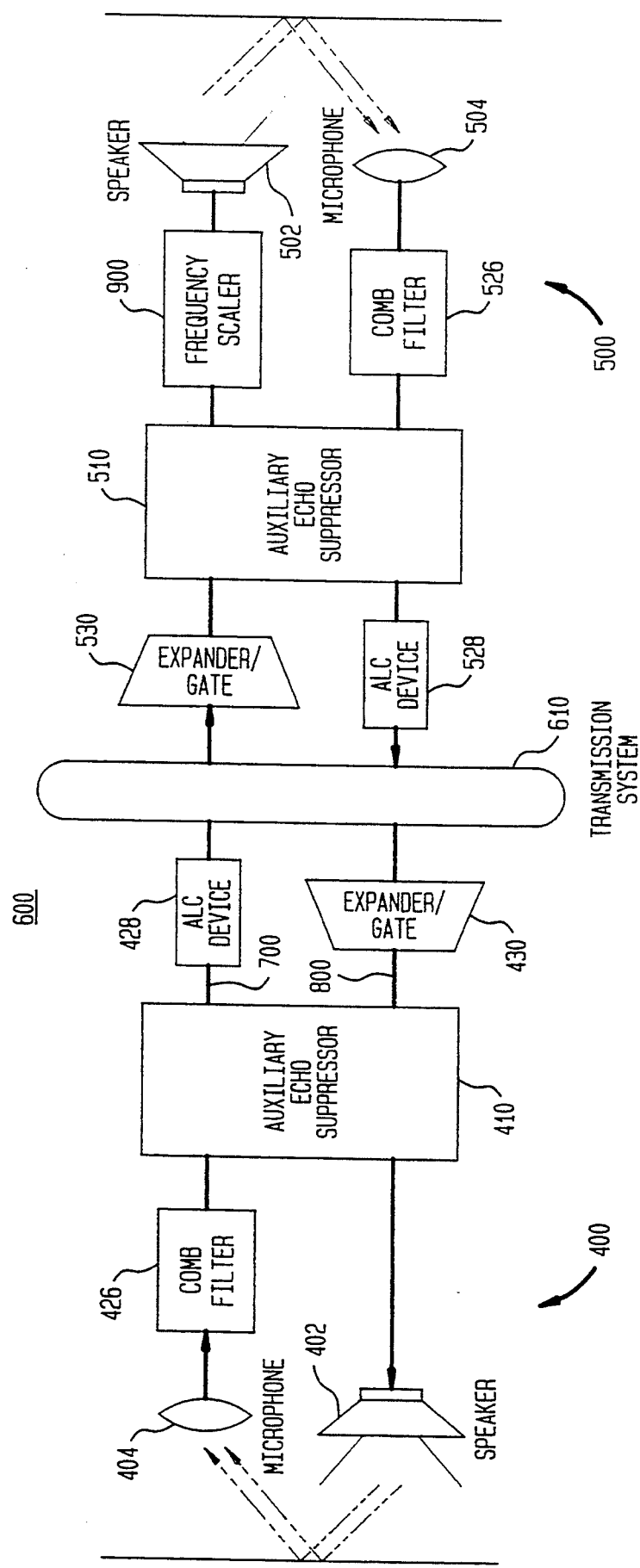
FIG. 6 shows an illustrative embodiment of an audio processing system which reduces far-end talker echo and increases the margin of acoustic stability in teleconferencing systems having high or low transmission delay.

Another alternative embodiment of an audio processing system is depicted in FIG. 6 and implements comb filters with sinusoidal band transitions in combination with auxiliary echo suppressors. This illustrative embodiment of an audio processing system reduces far-end talker echo and increases the margin of acoustic stability in teleconferencing systems having low or high transmission delays. This capability makes the system versatile enough to be used in virtually any point-to-point teleconferencing system. Specifically, FIG. 6 depicts a microphone 404 at a station 400 connected to a speaker 502 at a station 500 by a channel 700 which passes through a transmission system 610. Similarly, a microphone 504 at a station 500 is connected to a speaker 402 at a station 400 by a channel 800, which also passes through transmission system 610.

The audio processing system of FIG. 6 also includes a frequency scaler 900 which may be utilized to increase the margin of acoustic stability as do the frequency scalers 60 and 120 of FIGS. 2 and 5, respectively. A frequency scaler 900 is illustratively shown in FIG. 6 to be located in channel 700 at station 500. However, the frequency scaler 900 could be located in channel 700 at station 500 or in channel 800 at stations 400 or 500. FIG. 6 also includes other devices for reducing noise and smoothing out the operation of the individual components. Below, a description of the function of each component in the context of the overall arrangement is provided.

The auxiliary echo suppressors 410, 510 function similar to the echo suppressors 210 and 310 of FIG. 5. A block diagram of an illustrative embodiment of the auxiliary echo suppressor 410 is shown in FIG. 6A. As shown in FIG. 6A, the signal from microphone 404 on channel 700 enters the auxiliary echo suppressor 410, and a portion of the signal is directed to the short-energy calculator 411 which determines the energy level of the signal from the microphone ($E_{local}$). A signal from the far-end directed towards speaker 402 on channel 800 also enters the auxiliary echo suppressor 410, and a portion of the signal is directed toward another short-energy calculator 412 which determines the energy level of the signal from the far end ($E_{far-end}$). A comparator 413 compares the strength of the $E_{local}$ signal to that of the $E_{far-end}$ signal, and the result of this comparison is input to a variable attenuator 414 to control the level of attenuation being inserted in channel 700. The auxiliary echo suppressor 510 at station 500 functions similarly to that depicted in FIG. 6A to insert an attenuation in channel 800 based upon a comparison of the energy level of the signal output from microphone 504 and the energy level of the signal directed towards speaker 502.

The operation principle of the auxiliary echo suppressor 410, 510 is illustrated in FIG. 7 which shows a plot of the attenuation inserted on a channel at a microphone output. With reference to FIG. 7, the attenuation inserted by the auxiliary echo suppressor 410 at station 400 is described as follows. The level of attenuation inserted is a function of the difference between the energy level of the signal received at speaker 402 at station 400 from the far end ($E_{far-end}$) and the energy level of the signal output from the microphone 404 at station 400 ($E_{local}$).

The plot in FIG. 7 shows that when the two signals are of comparable strength, no attenuation is inserted because, under such conditions, any echo will be effectively masked by the local speech which is assumed to be present in this case. However, when the signal received from the far end, $E_{far-end}$, is stronger than the signal output from microphone 404, $E_{local}$, by some minimum pre-defined amount, no local speech is assumed present and, therefore, attenuation is introduced to suppress the echo. The auxiliary echo suppressor 510 at station 500 similarly introduces attenuation into channel 800 when the signal destined for speaker 502 is stronger than the signal received from the microphone 504 by a pre-defined minimum amount.

Typically when an echo suppressor such as 410 and 510 is used alone to subjectively eliminate echoes, the pre-defined minimum difference is set at 6 dB. This difference is based on the average minimum echo return loss due to room acoustics and microphone/speaker placement. Thus, if the signal leaving the microphone is weaker than the signal entering the speaker by at least 6 dB, no local speech is assumed present, and maximum attenuation is introduced in the microphone signal path. However, local speech that is more 6 dB lower than the signal destined for the speaker will be suppressed as echo. Having such a low threshold (6 dB) imposes rather tight and unrealistic constraint on the dynamic range of the local speech, since no one sits exactly the same distance from the microphone or talks with the same loudness.

Between the microphone 402 and auxiliary echo suppression 410 at station 400, comb filter 426 is inserted, and between the microphone 502 and auxiliary echo suppression 510 at station 500, comb filter 526 is inserted. The comb filters 426 and 526 are complementary. Placing the comb filters 426 and 526 as such in channels 700 and 800, respectively, helps the auxiliary echo suppressors 410 and 510 more readily distinguish between the acoustically coupled far-end speech (echo) and the locally generated speech since the echo will have been processed by both complementary comb filters, but the local speech will have been processed by only one of the two comb filters. Therefore, on average the difference between the echo and locally generated speech will be increased by approximately 12 dB as discussed previously. The 12 dB additional average separation between the echo and the local speech allows the threshold to be raised from 6 dB to 18 dB in the echo suppressor. The increased threshold greatly reduces the chance of local speech being mistaken for echo and therefore being unnecessarily attenuated at the auxiliary echo suppressors 410 and 510.

In this embodiment of the invention, both comb filters are active continuously regardless of whether there is a teleconference participant at only one station or at both stations. The continuous activity of the comb filters is possible as in the case of low transmission delays since the filters have smooth band transitions, and therefore the speech quality is virtually unaffected. As mentioned previously, we can relax the constraints on the comb filters since echo is masked by local speech when participants at both ends of the conference are talking (i.e., double talk), and since auxiliary echo suppressors remove any residual echo when only one end is generating speech.

Thus, our unique combination and arrangement of comb filters and auxiliary echo suppressors in conjunction with a frequency scaler allow design constraints otherwise imposed upon comb filters and echo suppressors to be greatly relaxed. The relaxation of such constraints results in significant improvements in the quality of audio conferencing regardless of the round-trip transmission delay of the teleconferencing system. Specifically, imperceptible acoustic echo, acoustically stable performance, full interactivity, and low speech signal distortion are achieved. Since the frequency scaler, comb filters, and echo suppressors as well as room acoustics treatments and microphone/speaker placement techniques could provide the necessary echo return loss enhancement and margin of acoustic stability, additional attenuation may not be required. Therefore, the fully-interactive nature of the system is preserved.

Signals exiting the auxiliary echo suppressors 410 and 510 on channels 700 and 800, respectively, are processed by automatic level controlling (ALC) devices 428 and 528, respectively, before entering transmission system 610. Illustratively, these devices 428, 528 can be implemented. The ALC devices 410 and 510, such as those described in U.S. Pat. No. 5.029,162, output all speech signals with roughly the same intensity regardless of the speaking style of the teleconference participant. Such control of the speech signal levels will ensure that signals entering the transmission system 610 and eventually the audio equipment at the far end are within the desired dynamic range. Therefore, a very strong speech signal due to a loud talker will not overload the codec (see FIG. 1) and any other equipment that succeeds it.

As a signal exits the transmission system 610 on channel 700 destined for speaker 502 for reception, the signal is processed at an expander/gate 530 to reduce the ambient and transmission noise and to smooth out the operation of the echo suppressor. Similarly, a signal exiting the transmission system 610 on channel 800 destined for speaker 402 for reception, the signal is processed at an expander/gate 430. Therefore, signals transmitted from microphone 504 at station 500 through the transmission system 610 toward speaker 402 at station 400 are processed at expander/gate 430, and signals transmitted from microphone 404 at station 400 through the transmission system 610 toward speaker 502 at station 500 are processed at expander/gate 530. The expander/gates 430 and 530 are used to reduce the ambient and transmission noise contained in the signals. As the name of this device implies, the expander/gate increases the dynamic range of the input signal by a given multiple if its intensity fails below a pre-defined threshold.

For discussion purposes, an expander/gate having an expansion ratio of 3:1 and a threshold of 0 dBm is assumed. Under these assumptions, if the average level of the incoming signal is below the threshold, say at $-10$ dBm, the signal is assumed to contain noise and will be output at $-30$ dBm. On the contrary, if the incoming signal is near or above the threshold, say at 10 dBm, the signal is assumed to contain speech and is output at the same level (here, 10 dBm). The expander/gate threshold should be set such that when the incoming signal contains speech, it is near or above the threshold. But when no speech is present the incoming signal is below the threshold.

Figure 8:
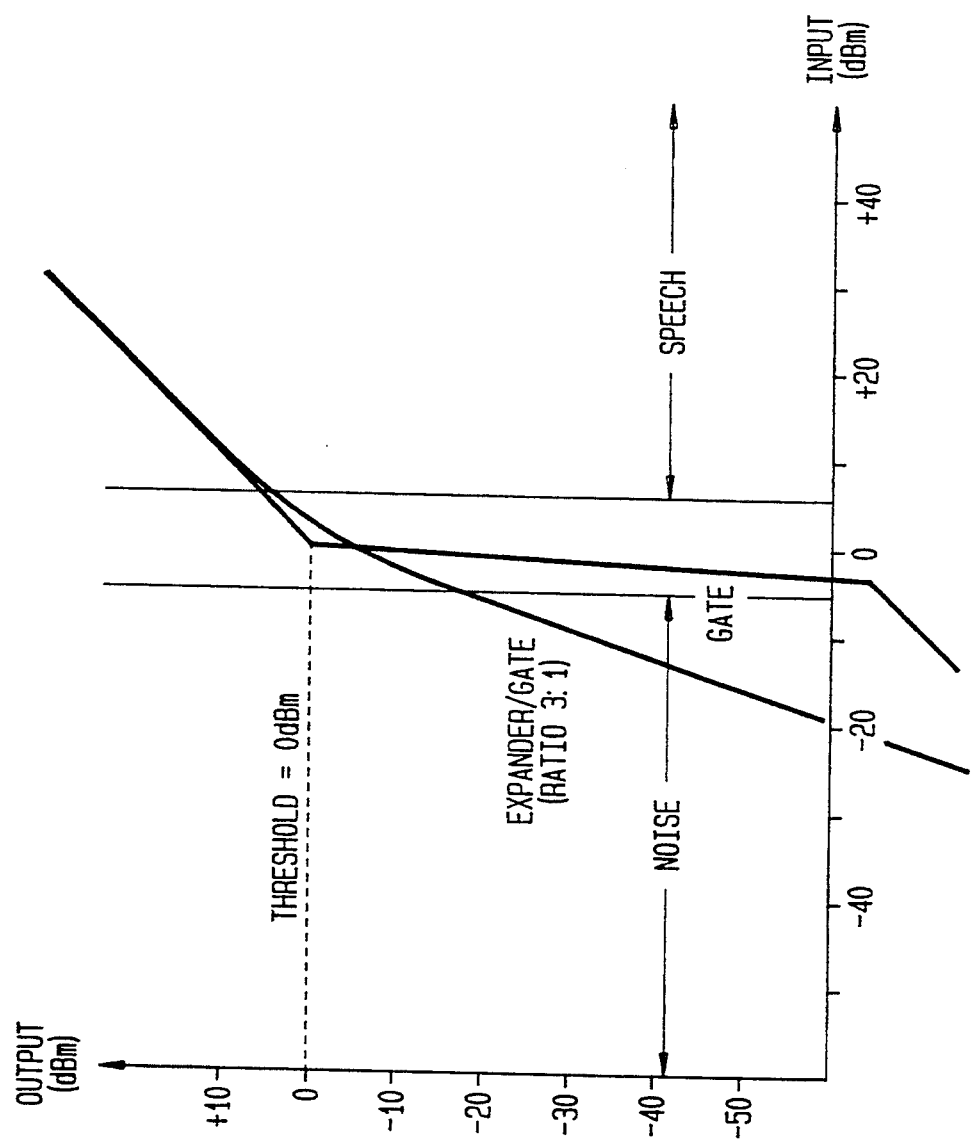
FIG. 8 illustrates typical response curves of a noise gate and an expander/gate.

A noise gate could be used instead of an expander/gate. One major difference between an expander/gate and a noise gate is that the latter has a response curve characterized by a hard knee at the threshold, while the former has a smooth knee curve that prevents the speech signal from being mutilated by the device even if the signal falls very near the threshold. We have shown typical response curves of the noise gate and expander/gate in FIG. 8.

In summary, the embodiment of the audio processing system depicted in FIG. 6 achieves acoustically stable and essentially echo-free performance and provides full-duplex and highly interactive service. Due to the introduction of the comb filters, the threshold of the auxiliary echo suppressor can be increased by 12 dB, thus virtually eliminating the probability of mistaking local speech for echo.

CONCLUSION

In short, an audio processing system for a teleconferencing system has been disclosed. The audio processing system reduces far-end echo and increases the margin of acoustic stability. Finally, the above-described embodiments of the invention are intended to be illustrative only. Numerous alternative embodiments may be devised by those skilled in the art without departing from the spirit and scope of the following claims.

What is claimed is:

1. An audio processing system for teleconferencing systems, said audio processing system having high and low transmission delays, comprising:

at a first station, first microphone means for detecting and transmitting a first signal having an intensity, and first speaker means for receiving a second signal having an intensity, at a second station, which is remotely located from the first station, second microphone means for detecting and transmitting said second signal for transmission to said first speaker means and second speaker means for receiving said first signal from said first microphone means;

a first audio channel connecting said first microphone means with said second speaker means through a transmission system;

a second audio channel connecting said second microphone means with said first speaker means through said transmission system;

first echo suppressor means connected to said first microphone means and said first speaker means for generating and inserting a first variable attenuation in said first channel at the output of said first microphone means, said first variable attenuation being generated based upon the intensity of said first signal transmitted from said first microphone means and the intensity of said second signal being received by said first speaker means;

second echo suppressor means connected to said second microphone means and said second speaker means for inserting a second variable attenuation in said second channel at the output of said second microphone means, said second variable attenuation being generated based upon the intensity of said second signal transmitted from said second microphone means and the intensity of said first signal being received by said second speaker means; and first and second comb filters having complementary pass and stop bands located in said first and second channels, respectively, said first comb filter being located between said first microphone means and said first echo suppressor means and said second comb filter being located between said second microphone means and said echo suppressor means, said first and second comb filters attenuating echo, which includes signals coupled between said first speaker means and said first microphone means at said first station and between said second speaker means and said second microphone means at said second station, such that said first and said second echo suppressor means generate said first and said second variable attenuation, respectively, based on said first and second signals substantially excluding echo to improve the performance of said first and second echo suppressor means.

2. The audio processing system of claim 1 wherein said first and second signals each includes local speech and acoustically coupled speech and wherein said first and second comb filters comprise means for processing said first and second signals to assist said first and second echo suppressor means, respectively, in distinguishing between the acoustically coupled speech and the local speech.

3. The audio processing system of claim 2 wherein a separation between the acoustically coupled speech and the local speech of said first and second signals is at least 18 dB.

4. The audio processing system of claim 1 wherein said first echo suppressor means comprises means for comparing the intensity of said first signal transmitted from said first microphone means and the intensity of said second signal being received by said first speaker means and said second echo suppressor means comprises means for comparing the intensity of said second signal transmitted from said second microphone means and the intensity of said first signal being received by said second speaker means, said comparing means producing an input signal for determining the variable attenuation to be inserted.

5. The audio processing system of claim 4 wherein said first echo suppressor means inserts substantially zero attenuation when the intensity of said first signal transmitted from said first microphone means is substantially the same as the intensity of said second signal being received by said first speaker means and said second echo suppressor means inserts substantially zero attenuation when the intensity of said second signal transmitted from said second microphone means is substantially the same as the intensity of said first signal being received by said second speaker means.

6. The audio processing system of claim 1 further comprising a first and second expander/gate for reducing ambient and transmission noise and increasing the dynamic range of said first and second signals by a pre-defined multiple if the intensity of said first and second signals, respectively, is below a pre-defined threshold, said first expander/gate being located between said first echo suppressor means and said transmission system in said second channel, and said second expander/gate being located between said second echo suppressor means and said transmission system in said first channel.

7. The audio processing system of claim 6 wherein for said first and second expander/gate, said pre-defined multiple is 3 to 1 and said threshold is substantially 10 dB lower than said first signal and said second signal, respectively.

8. The audio processing system of claim 6 further comprising first and second automatic level control devices, for controlling the intensity of said first and second signals on said first and second channels, respectively, said first device being located between said first echo suppressor means and said transmission system in said first channel and said second device being located between said second echo suppressor means and said transmission system in said first channel.

9. A station of an audio processing system for teleconferencing systems, said audio processing system having high and low transmission delays and said station being connected to another station, comprising:

microphone means for detecting and transmitting a first signal having an intensity, and speaker means for receiving a second signal having an intensity;

a first audio channel connecting said microphone means with other speaker means at said other station through a transmission system;

a second audio channel connecting said speaker means with other microphone means at said other station through said transmission system;

echo suppressor means connected to said microphone means and said speaker means for generating and inserting a variable attenuation in said first channel at the output of said microphone means, said variable attenuation being generated based upon the intensity of said first signal transmitted from said microphone means and the intensity of said second signal being received by said speaker means; and a comb filter located in said first channels between said microphone means and said echo suppressor means and having complementary pass and stop bands to another comb filter at said other station, said comb filter attenuating echo, which includes signals coupled between said speaker means and said microphone means and between said other speaker means and said other microphone means at said other station, such that said echo suppressor means generate said variable attenuation based on said first and second signals substantially excluding echo to improve the performance of said echo suppressor means.

* * * * *